United States Patent [19]

Schacht

[11] 4,380,369
[45] Apr. 19, 1983

[54] ADJUSTABLE SUPPORT SYSTEM FOR CYCLE MIRROR

[75] Inventor: Barry M. Schacht, Boulder, Colo.

[73] Assignee: Mirrycle Corporation, Boulder, Colo.

[21] Appl. No.: 223,412

[22] Filed: Jan. 8, 1981

Related U.S. Application Data

[63] Continuation-in-part of Ser. No. 95,480, Nov. 19, 1979, abandoned, Ser. No. 120,975, Feb. 13, 1980, abandoned, and Ser. No. 120,977, Feb. 13, 1980, abandoned.

[51] Int. Cl.³ .............................................. G02B 7/18
[52] U.S. Cl. .............................. 350/307; 248/475 B; 248/487
[58] Field of Search .............................. 350/307, 320; 248/475 B, 487, 481-484; 280/289 H, 289 R; 74/551.8

[56] References Cited

U.S. PATENT DOCUMENTS

| | | | |
|---|---|---|---|
| 564,454 | 7/1896 | Ryan | 350/307 |
| 2,968,995 | 11/1961 | Holden | 248/467 |
| 3,120,369 | 2/1964 | Gray | 248/467 |
| 3,377,117 | 4/1968 | Biscow | 248/467 |
| 4,054,375 | 10/1977 | Ribeca | 350/307 |
| 4,135,788 | 1/1979 | Sargis | 248/475 B |
| 4,291,590 | 9/1981 | Mizusaki | 350/307 |

*Primary Examiner*—Jon W. Henry
*Attorney, Agent, or Firm*—Donald W. Margolis; Klaas & Law

[57] ABSTRACT

An adjustable rear view mirror support system for cycles is disclosed, which support system includes means designed to be attached to, or be integral with, a brake lever bracket assembly, which brake assembly is in turn adapted to be mounted on a cycle handlebar. The mirror support system is designed to allow adjustment of a supported mirror independently in at least two directions, while the mirror support is attached to a part of a brake lever bracket assembly mounted on a cycle handlebar. Various specific means for attaching the mirror support system to a brake lever bracket assembly, or constructing a portion of the support system integral with a brake lever bracket assembly, are disclosed.

17 Claims, 10 Drawing Figures

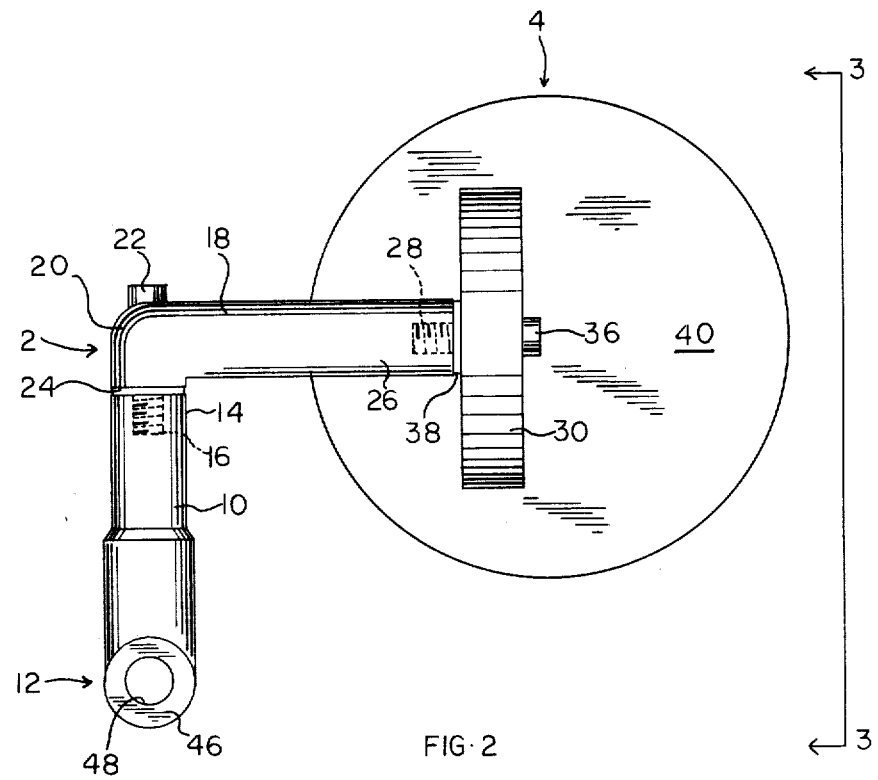
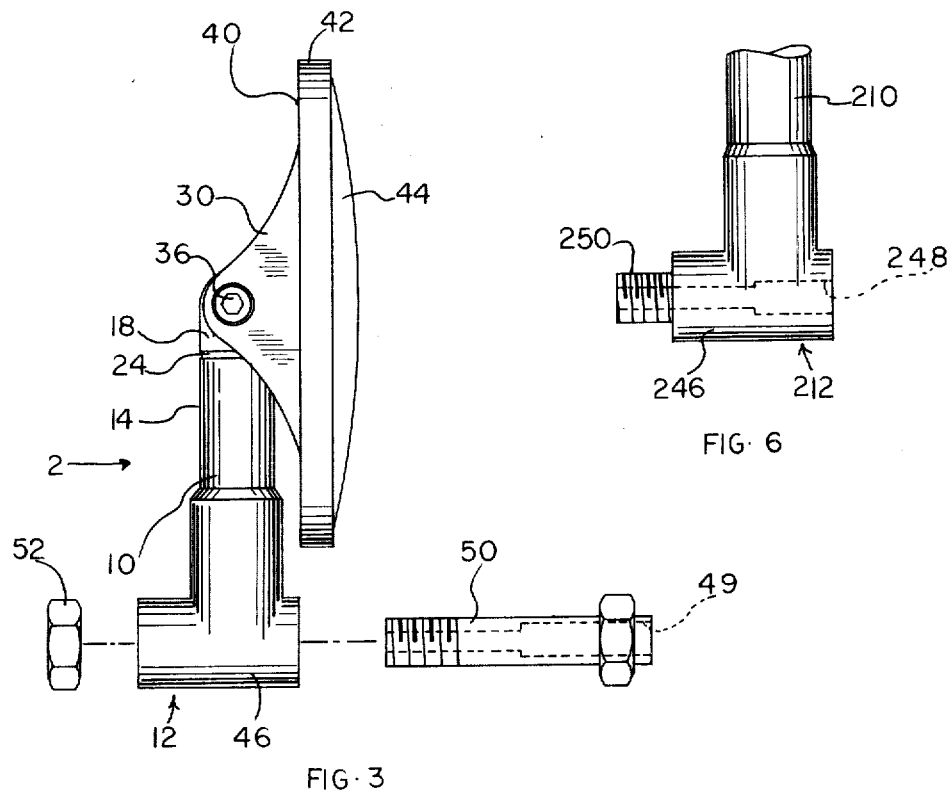

ADJUSTABLE SUPPORT SYSTEM FOR CYCLE MIRROR

CROSS-REFERENCE TO RELATED APPLICATIONS

This is a continuation-in-part application of copending applications Ser. Nos. 95,480, filed Nov. 19, 1979 and 120,975; and 120,977, the latter two both filed Feb. 13, 1980 all of which are now abandoned.

BACKGROUND OF THE INVENTION

1. Field of the Invention

The present invention relates to an adjustable support system for a rear view mirror for a cycle, and more particularly, to a rear view mirror system which is designed to be mounted on, or be a part of, a brake lever bracket assembly, which brake assembly is mounted on the handlebar of a bicycle.

2. Description of the Prior Art

It has long been recognized that it is desirable to provide a rear view mirror upon land vehicles, including cycles such as bicycles, motorcycles, and the like. The provision of a rear view mirror on a cycle or other vehicle provides the operator with the ability to be aware of conditions behind the direction of travel of his or her vehicle, without the requirement for substantial head or eye movement which could distract his or her attention from the path ahead. This ability to keep one's attention focused ahead and to minimize head motion is especially important to users of relatively small, light two-wheeled vehicles, such as bicycles, which must be balanced by the rider while simultaneously avoiding impact with potentially upsetting obstacles in the path of the cycle's movement. In the past, cycle rear view mirrors have most commonly been mounted upon supports directly on the handlebar of a cycle, thus making a portion of the handlebar unavailale for use by a rider. Complete use and availability of all portions of the handlebar is particularly important for cycles with drop style handlebars. Other mounting locations, including the crossbars, the diagonal bars, the handlebar mounting head, the end of the handlebar, or on the rider, for example, attached to a special eyeglass frame, helmet or wrist mounting assembly have been disclosed. With but a few exceptions, such locations for a mirror have limited the field of rear view, since the body of the rider or the cycle have substantially obstructed a portion of the field of rear view. In one instance, U.S. Pat. No. 4,054,375, discloses a mirror which may be attached to a user's wrist or to the brake lever assembly of a cycle. Unfortunately, when mounted on the brake lever assembly, it interferes with the placement of a rider's hand on the brake lever bracket assembly.

In order for a cycle rear view mirror to be mounted effectively, it should be supported in such a manner and by such means that it can be adjusted to almost any direction of rear view and then retained in that position with a substantial amount of stability. Yet, due to the generally fragile nature of the mirror structure itself, it should be constructed in a manner which provides a reasonable amount of protection to the mirror against breakage, for example, upon the impact of the cycle with an obstruction or the ground.

Therefore, it is an object of the present invention to provide an improved support system for a cycle rear view mirror, which support system provides controllable, stable, substantially universal orientation to a mirror while including means for non-interfering attachment of the mirror support to a brake lever bracket assembly, which brake lever assembly is in turn, mounted on the cycle handlebar. Thus, the mirror would be located by its support to provide a substantially unobstructed rear view, and yet no additional portion of the handlebar or brake lever assembly would be rendered unavailable for use due to the location of the mirror support.

It is also an object to provide mirror support systems which include means for attachment to or integration with various types of brake lever bracket systems.

Another object is to provide such a mirror support system which is located and designed to resist or avoid breakage to a mirror mounted on the support system.

Still another object is to provide novel methods for assembling and adjusting rear view mirror support systems on, or integral with, a brake lever bracket assembly.

Yet another object of the present invention is to provide a rear view mirror support system which can be attached to a cycle without limiting or restricting the use of the cycle's handlebars or brake lever bracket assembly, and to teach methods for attaching such support systems.

An additional object of this invention is to provide a cycle rear view mirror support system which protrudes beyond or outside of the cycle's structure a minimal distance, and which tends to rotate out of the way, thus, resisting breakage, upon being subjected to impact with an obstruction or with the ground.

SUMMARY OF THE INVENTION

It has been found that the foregoing and related objects and advantages may be readily attained in a support system for a rear view cycle mirror by providing a mirror support system which includes means for attachment or integration with a cycle brake lever bracket system which is in turn mounted on, or designed to be mounted on, a cycle handlebar. This result is obtained in a cycle mirror support system, by providing a support system having a base member which includes means designed to be attached to, or be integral with a brake lever bracket assembly, an arm pivotally secured adjacent one end of the base member, and a mirror mounting portion pivotally secured at the opposite end of the arm, the base and the arm normally being mounted at an angle to one another. In preferred embodiments, the portion of the base member attached to the brake lever bracket assembly is mounted in a manner which allows it to be pivotally rotated at its point of attachment to the brake lever bracket assembly. In many instances, the support system of the present invention includes means which are capable of being attached to the brake lever bracket assembly at pre-existing holes or other pre-existing features of the brake assembly, thus requiring little or no mechanical modification of the brake assembly to render it able to accept and attach the mirror support system of the present invention.

BRIEF DESCRIPTION OF THE DRAWINGS

The foregoing and other objects, features and advantages of the invention will be apparent from the following more particular description of the preferred embodiments of the invention, as illustrated in the accompanying drawings in which:

FIG. 2 is a plan back view of the mirror support shown in FIG. 1;

FIG. 3 is a side plan view of the support of FIGS. 1 and 2 taken along line 3—3 of FIG. 2, and showing exploded therefrom other elements which may be utilized to secure the support to a brake lever bracket assembly;

FIG. 6 is a side plan fragmentary view of another modified form of the present invention;

DESCRIPTION OF THE PREFERRED EMBODIMENTS

Figure 1:
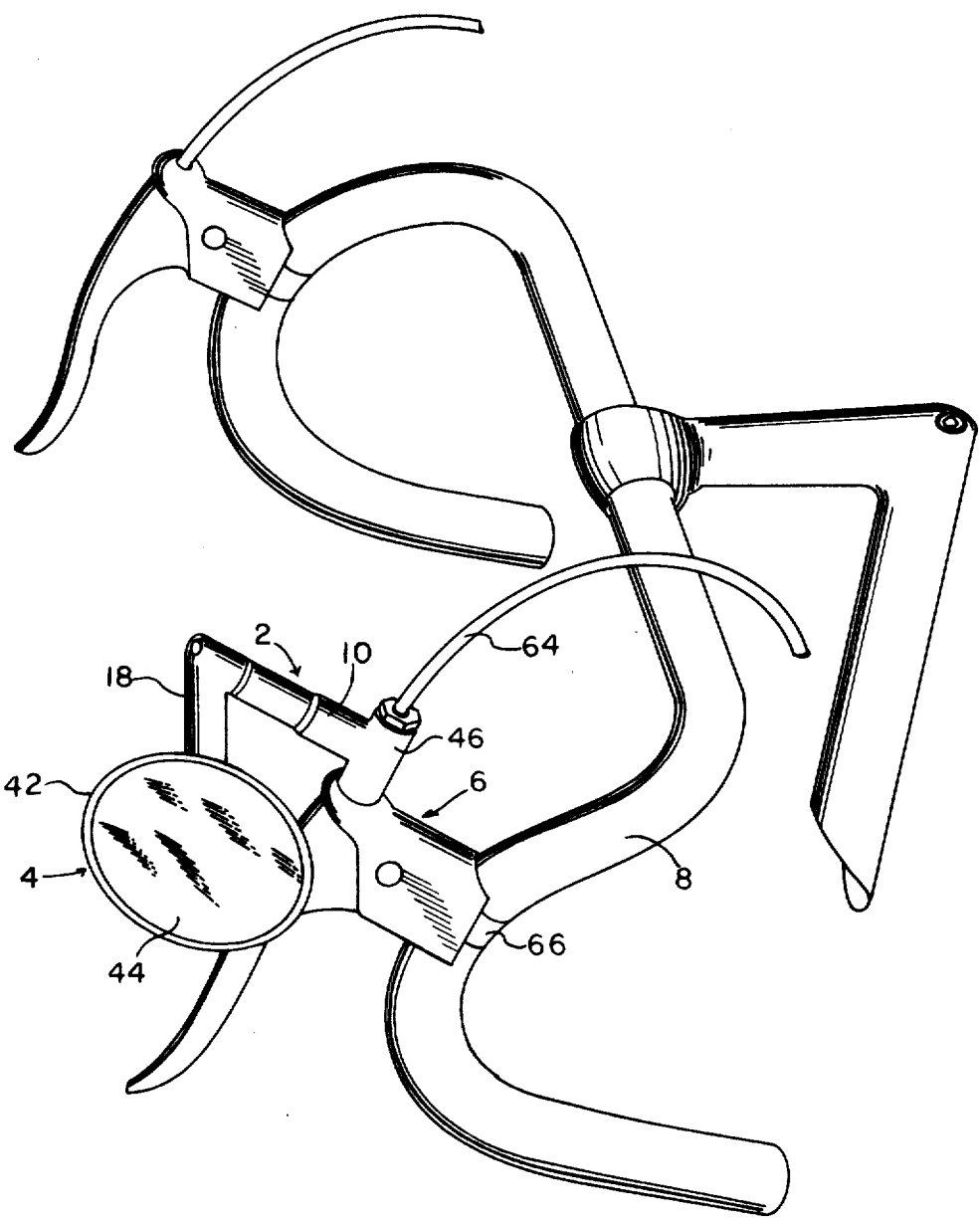
FIG. 1 is a perspective view of one embodiment of the present invention shown mounted on a brake lever bracket assembly on a handlebar of a fragmentary cycle.

Referring now to the drawings, in which like numbers represent like parts in the different FIGS., and especially FIGS. 1-4, a mirror support system embodying the present invention, generally designated by the numeral 2 is shown carrying mirror assembly, generally designated as 4, mounted on brake lever bracket assembly, generally designated as 6, which brake assembly 6 is in turn mounted on handlebar 8 of a cycle, not shown. Mirror support system 2 is comprised of a base member 10 having a first end means 12 designed for attachment to brake lever bracket assembly 6. Opposed to end 12 of base member 10 is end 14 which includes pre-threaded hole 16, shown in phantom in FIG. 2, which opens externally from base member 10. Mirror support system 2 also includes arm 18 which is pivotally attached at an angle to end 14 of base 10. End 20 of arm 18 carries an opening therethrough, not shown, through which tension screw 22 can be inserted to contact pre-threaded hole 16, screw 22 thus providing varying degrees of tension between end 14 of base 10 and end 20 of arm 18. In preferred embodiments, tension screw 22 is mounted through washer 24, before being jointed to pre-threaded hole 16, thus causing the tension adjustments between base 10 and arm 18 to be held firmly, but pivotally around tension screw 22.

Arm 18 also includes end 26, shown in FIG. 2, which carries pre-threaded hole 28, shown in phantom, which pre-threaded hole opens externally from arm 18. Adjacent to end 26 of arm 18 is mirror mounting support 30. Mounting support 30 is pivotally secured to arm 18 by means of tension screw 36 extending through a hole in support 30, not shown, through washer 38, and into pre-threaded hole 28, thus securing mirror mounting 30 to arm 18 pivotally around tension screw 36. Mirror 4 is attached to or integral with mounting support 30, and normally includes a back portion 40 and a frame 42 within which mirror 44 is secured. In FIG. 3, mirror 44 is sown as being convex, as this form of mirror is known to give a wide angle of view.

Figure 4:
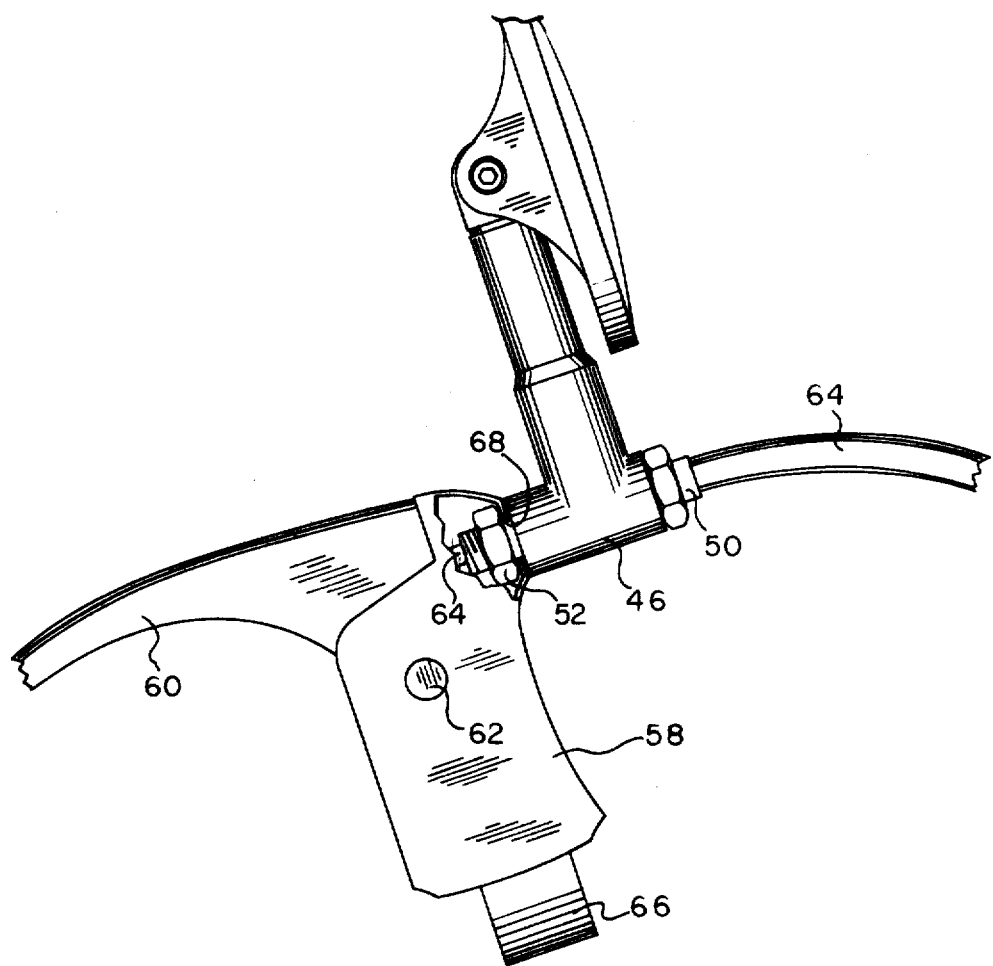
FIG. 4 is a side plan view, similar to FIG. 3 of the cycle mirror mounting system attached to a brake lever bracket assembly which is partially broken away to reveal internal details of how the mounting system is attached to the brake assembly.

In the preferred embodiment shown in FIGS. 1-4, end 12 of base 10 carries integral therewith tube 46 including hole 48, see FIG. 2. Tube 46 allows for simple convenient mounting of support system 2 on a brake lever bracket assembly with a minimum of effort, and at a location which does not interfere with the operation of the brake lever. This is most simply accomplished, for example, by using several additional mechanical parts, as shown in FIGS. 3 and 4, including hollow bolt 50, having opening 49 therethrough, and nut 52. Details of how this embodiment of the mirror support assembly is mounted on a brake lever bracket assembly are best shown by reference to FIGS. 3 and 4.

As used herein, and throughout the entire specification and claims, the terms "brake lever bracket assembly", "brake lever assembly" or "brake assembly" is intended to include lever bracket 58, lever 60, pivot 62, cable 64, attaching collar 66, opening 68 in bracket 58 through which cable 64 normally enters, and generally any and all parts making up those portions of the brake lever bracket assembly mounted on or adjacent to a cycle handlebar.

In normal brake operation, cable 64 is secured to lever 60, within the lever bracket by means not shown, so that rotation of lever 60 around pivot 62 results in movement of brake cable 64 to actuate, for example, caliper brakes, not shown. Anything which interferes with the movement of lever 60, brake cable 64 or the placement of a rider's hand on the brake lever bracket assembly will impede the braking efficiency of the brake system. In the present invention, tube 46 carried by base member 10 of the support system 2 is located so that when the support system 2 is attached to brake assembly 6, cable 64 can pass therethrough without being hindered. Also, location of mirror support system 2, at what amounts to the top of the brake assembly, avoids interfering with a rider's use of brake lever 60, or hand placement on the brake lever bracket assembly or handlebar.

Mirror support system 2 is mounted on brake assembly 6, for example, by disconnecting brake cable 64 from its point of connection with lever 60, not shown, inserting hollow bolt 50 through hole 48 of base tube 46 and on through opening 68 of lever bracket 58. Then nut 52 is placed within bracket 58, and threaded onto hollow bolt 50 to secure bolt 50 and support 2 carried by bolt 50 in place against the top of the brake assembly. Then brake cable 64 is inserted through opening 49 of bolt 50 and reconnected to lever 60. Mirror assembly 4 is adjusted to any angle of reflection desired by rotating the support system, as required, around bolt 50, and pivot screws 22 and 36, followed by their subsequent tightening. It is preferred that nut 52 and pivot screws 22 and 36 be tightened to a point of stiffness, but not be tightened totally against movement so that mirror adjustments can be made to the mirror, but more importantly, so that the mirror can pivot out of the way on crash or impact of the cycle.

Support system 2, so mounted, locates mirror assembly 4 at the outermost point of the cycle, thereby providing an unobstructed rear view, while allowing base 10 and arm 18 to remain quite short. In riding use, short base 10 and short arm 18 minimize vibrations of mirror assembly 4, as compared to the amount of vibration which longer elements would generate in the mirror. As so located, mirror 44 can be utilized with a minimum of easily learned head and eye movement, and a rider can place his or her hands and arms at any location on the handlebars and lever bracket assembly without being obstructed by a mirror support.

Figure 5:
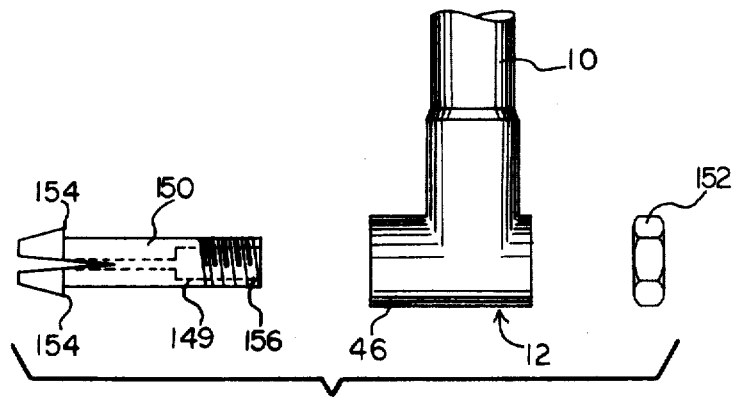
FIG. 5 is a side plan fragmentary view of a modified form of the present invention.

Many modifications are possible to the present invention. For example, the modification shown in FIG. 5 utilizes threaded hollow expanding member 150 in place of hollow bolt 50. Member 150 includes opening 149 therethrough, which connects through tube 46 of base 10. In this modification, spread fingers 154 are designed to be snap fit through opening 68 of bracket assembly 58 without the need for the use of a nut to secure it to the bracket assembly. Expanding member 150 is then secured in place by means of nut 152, which is external to both the bracket assembly and the support system and threaded on to threaded end 156 of member 150 to secure base 10 of the support system in place. Thus, this modification utilizes the same support system as that of forth and FIGS. 1-4, but provides different means for securing the support system to the brake lever bracket assembly.

A related modification is shown in FIG. 6. In this modification, base 210 carries end 212 which includes hollow tube 246, through which opening 248 extends, and which terminates in an integral reduced threaded end 250. This modification allows threaded end 250 to be inserted through opening 68, of bracket assembly 58, without the need for a separate hollow bolt 50 or expanding member 150. The threaded end 250 can be secured within bracket assembly 58 by means of a nut in substantially the same manner as shown in FIG. 4.

Other related modifications include, for example, threading opening 68, threading not shown, so that a separate nut is not needed to join the support system of FIGS. 3, 4, and 6 to the brake lever bracket assembly. Alternatively, rather than utilizing hollow bolt 50 or expanding member 150, a hollow tube, not shown, threaded at both ends, could be inserted through hole 48 of base 10 and secured at both ends, that is within bracket assembly 58 and external to tube 46, with a pair of nuts. In another fully equivalent modification, arm 18 may be eliminated and mirror mounting support 30 secured directly to base 10. In another equivalent form, support 30 could be readily modified, for example, to include a universal pivot, not shown.

Figure 7:
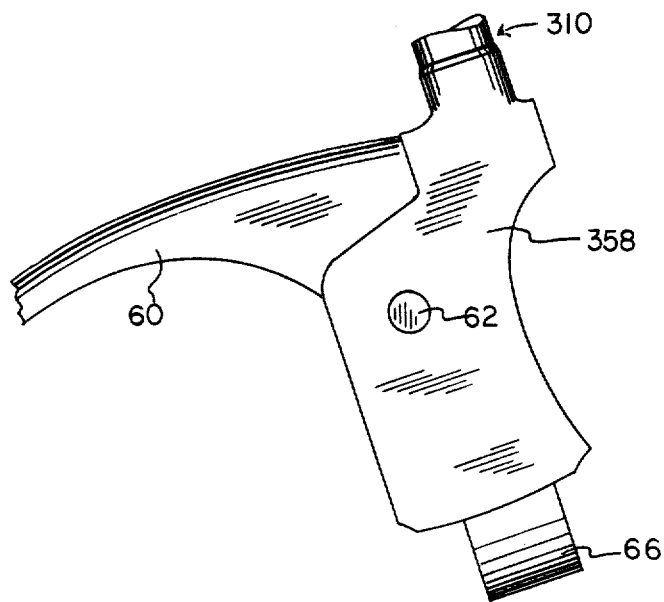
FIG. 7 is a fragmentary side plan view of still another modification of the present invention, in which the support and a portion of the brake lever bracket assembly system are integral with one another.

In the modification shown in FIG. 7, bracket assembly 358 is integral with mirror support base 310. Thus, in this system, the means for securing the support to the brake lever bracket assembly, is the brake bracket assembly 358 itself. In all other ways, this modified mirror support system operates in the same manner as shown in FIGS. 1-4, and described above.

Figure 8:
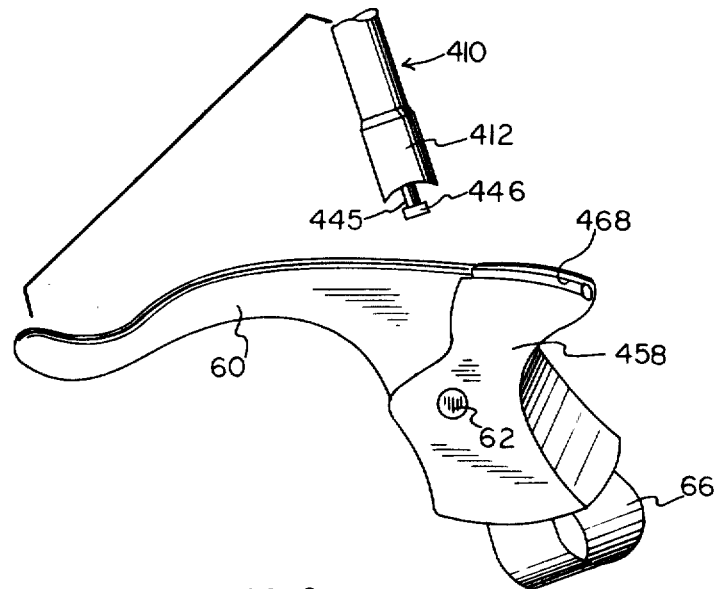
FIG. 8 is a front perspective fragmentary view of yet another modification of the support of the present invention in which the brake lever bracket assembly includes a slotted portion and the support system includes a flanged web for insertion into that slot.

Now referring to FIG. 8, another modification is shown in which brake lever bracket assembly 458 normally includes a slot 468. Where such a slotted bracket assembly is found, base 410 of the mirror support is easily modified at end 412 to include web 445 terminating in flange 446. In use, web 445 and flange 446 are inserted into slot 468, along the length of the slot, to lock base 410 within the slot by means of friction, tension, or other means. In all other ways, this mirror support system operates in the same manner as those shown in FIGS. 1-4 and described above.

Figure 9:
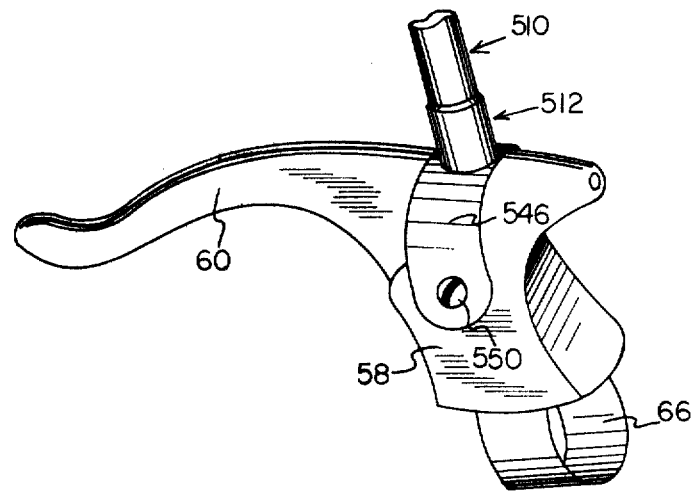
FIG. 9 is a perspective fragmentary view showing another modified form of the support system of the present invention attached to a brake lever bracket assembly at the pivot of the brake lever.
Figure 10:
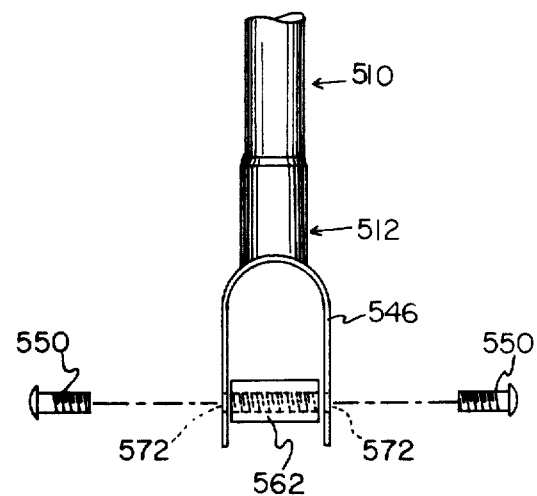
FIG. 10 is a side view of the support system of FIG. 10.

In the modifications shown in FIGS. 9 and 10, base 510 is modified at end 512 to include U-shaped saddle portion 546. This support system is attached to the brake lever bracket assembly 58 by removing pivot 62, replacing it with pivot 562, locating openings 572 in the legs of saddle 546 over the openings, not shown, normally present through bracket assembly 58, and the threaded holes in pivot 562, and then securing saddle 546 in place by inserting pivot bolts 550 through openings 572 of saddle 546, through the pivot openings not shown, in bracket assembly 58, and into threaded lever pivot 562. In all other ways, this mirror support system operates in the same manner as those shown in FIGS. 1-4 and described above.

It is thus seen that many means for accomplishing the objects of the present invention have been shown, and that others exist, all of which comply with the objects of the present invention in that they provide a support system for a cycle mirror, which support system is capable of being secured to a brake lever bracket assembly in a manner which does not interfere with the operation of the brake. The support systems thus provided have been shown to be controllable, stable and to provide substantially universal orientation for a mirror, while including means for non-interfering attachment of the mirror support to various brake lever bracket assemblies by various means. The support systems provide location and support for a cycle mirror which provides substantially unobstructed rear view, without rendering any portion of the handlebar or brake lever assembly unavailable for use due to the location of the support or the mirror. Generally, the support systems of the present invention have been shown to be usable with existing brake assembly structures. However, in some instances, minor mechanical modifications to a brake assembly structure may be required in order to accommodate the support of the present invention.

The support system of the present invention may be constructed of any suitable material. In preferred embodiments, the base member, arm and mirror support are comprised of molded polycarbonate plastic. However, they may also be formed of any other suitable synthetic resin, or of metal, such as aluminum, iron or steel. The materials utilized and the method of making the elements of the support are not in any manner considered to be a limitation upon the practice of the present invention.

It therefore will be understood that various changes and modifications to the preferred embodiments described herein are possible, and will be apparent to those skilled in the art. Such changes and modifications can be made without departing from the spirit and scope of the present invention. Therefore, while the foregoing preferred embodiments have been described and illustrated, it is understood that alterations and modifications may be made thereto and fall within the scope of the invention as claimed.

What is claimed is:

1. An adjustable support system for a cycle mirror which support system is designed for mounting on a standard cycle brake lever bracket assembly in a manner which will not interfer with the use or operation of said brake lever bracket assembly, wherein said brake lever bracket assembly defines at least one through hole and includes a lever bracket, a lever, and a lever pivot wherein the improvement comprises:

a base member having a first and a second end, wherein substantially adjacent said first end is included means designed for mechanical attachment or abutment of said base member at at least one of said through holes defined by said standard brake lever bracket assembly;

an arm, said arm having a first and second end said first end of said arm pivotally secured to said base substantially adjacent to said second end of said base and at an angle to said base, and a mounting member for supporting a mirror, said mounting member pivotally connected substantially adjacent to said second end of said arm; whereby such attachment or abutment of said support system to said standard brake lever bracket assembly is in a manner which will not interfer with the use or operation of said brake lever bracket assembly, and whereby further, by adjustment of said base member, said arm and said mounting member for supporting a mirror can be adjusted to substantially any direction of rear view and then retained in that direction with a substantial amount of stability.

2. The support system of claim 1 for use with one said bracket assembly wherein at least one said through hole defined by said bracket assembly includes a slot, wherein said means of attachment of said first end of said base member to said slot opening includes a web designed and dimensioned for insertion into said slot.

3. The support system of claim 2 wherein said web includes a flange extending at an angle therefrom, said web and flange designed for insertion of said web and flange into said slot for retention of said web within said slot.

4. The support system of claim 1 for use with one said brake lever bracket assembly wherein said opening defined by said bracket assembly is annular and normally located and designed to have said brake cable pass therethrough for attachment to said lever, wherein said means for attachment or abutment at said first end of said base member to said opening includes a substantially tubular member defining an opening therethrough, said opening in said tubular member designed for attachment to or abutment with said bracket assembly adjacent said cable opening to allow said brake cable to pass therethrough.

5. The support system of claim 4 wherein hollow connecting means, of lesser diameter than said brake cable opening, in said bracket assembly are included with said attachment means, said connecting means dimensioned to pass through said brake cable opening defined by said bracket assembly to thereby secure said base to said bracket assembly.

6. The support system of claim 5 wherein the portion of said hollow connecting means passing through said brake cable opening is threaded.

7. The support system of claim 5 wherein the portion of the hollow connecting means passing through said brake cable opening includes a plurality of flanged fingers.

8. The support system of claim 5 wherein said hollow connecting means are separate from said base, and of lesser diameter than, and greater length than the opening defined by said tubular member integral with said base member, said hollow connecting means dimensioned to extend into and pass through said cable opening in said bracket assembly and said tubular member to secure said base to said bracket assembly.

9. The support system of claim 8 wherein the portion of said hollow connecting means designed to pass into said cable opening is threaded.

10. The support system of claim 9 wherein said hollow connecting means is a hollow bolt.

11. The support system of claim 1 in which a mirror assembly is attached to or integral with said mounting member.

12. An adjustable support system for a cycle mirror which support system is designed for mounting on a standard cycle brake lever bracket assembly in a manner which will not interfer with the use or operation of said brake lever bracket assembly, wherein said brake lever bracket assembly includes a lever bracket, a lever, a lever pivot, and lever pivot openings through said lever bracket wherein the improvement comprises:

a base member having a first and a second end, wherein adjacent said first end is included a U-shaped saddle including a pair of legs designed and dimensioned to be mounted at said brake lever bracket assembly for mechanical attachment of said base member to said brake lever bracket assemblies; and a mounting member for supporting a mirror, said mounting member pivotally connected substantially adjacent to said second end of said base;

whereby such attachment or abutment of said support system to said standard brake lever bracket assembly is in a manner which will not interfer with the use or operation of said brake lever bracket assembly.

13. The support system of claim 12 wherein each leg has an opening therethrough, said openings designed, dimensioned, and located for alignment with said lever pivot openings defined by said brake lever bracket assembly.

14. A mirror mounting mechanism for a cycle, including, in combination;

a standard brake lever bracket assembly, said brake lever bracket assembly defining at least one through hole and including a lever bracket, a lever, and a lever pivot;

a base member having a first and a second end, wherein substantially adjacent said first end is included means designed for mechanical attachment or abutment of said base member at at least one of said openings defined by said standard brake lever bracket assembly; and a mounting member for supporting a mirror, said mounting member pivotally connected substantially adjacent to said second end of said base member;

whereby such attachment or abutment of said support system to said brake lever bracket assembly is in a manner which will not interfer with the use or operation of said brake lever bracket assembly.

15. The mirror mounting mechanism of claim 14 wherein said brake lever bracket assembly and said base member are unitary, integrated with one another, and in the form of a single piece.

16. The method of attaching an adjustable cycle mirror support system to a cycle which support system is designed for mounting on a standard cycle brake lever bracket assembly, wherein said brake lever bracket assembly defines at least one through hole and includes a lever bracket, a lever, a lever pivot and a brake cable, and wherein said support system includes a base member having a first and a second end, wherein substantially adjacent said first end is included means designed for mechanical attachment or abutment of said base member at at least one of said through holes defined by said standard brake lever bracket assembly, including the steps of:

aligning said means for attachment included with said base member with at least one of said through holes defined by said standard brake lever bracket assembly; and then mechanically attaching or abuting said support system to said lever bracket at said aligned through hole, whereby such attachment or abutment of said support system is in a manner which will not interfer with the use or operation of said brake lever bracket assembly.

17. The method of claim 16, wherein said standard brake lever bracket assembly includes a through hole normally located and designed to have said brake cable pass therethrough, and including said brake cable passing therethrough and operatively attached to said lever, and wherein said support system base includes attachment means at said first end which define a through hole, and wherein said support system includes a hollow bolt of lesser external diameter than the diameter of both said lever bracket assembly brake cable through hole and said support base through hole, said hollow bolt being externally threaded at at least one end and of greater length than said base through hole, said hollow bolt being dimensioned to extend into and pass through said lever bracket assembly brake cable through hole and said support base through hole, and wherein said support system also includes an internally threaded nut dimensioned to receive said threaded end of said hollow bolt, including the steps of:

(a) disconnecting said brake cable from said brake lever;
(b) inserting said threaded end of said hollow bolt through said through hole in said base
(c) placing said threaded nut within said lever bracket assembly adjacent said cable opening;
(d) passing said threaded end of said hollow bolt through said cable opening in said lever bracket assembly, and threading it into said nut, thereby connecting said bolt and nut together; and
(e) then placing said brake cable through said hollow bolt and reconnecting said cable to said brake lever.

* * * * *